US006882427B1

(12) United States Patent
Kendrick et al.

(10) Patent No.: US 6,882,427 B1
(45) Date of Patent: Apr. 19, 2005

(54) DYNAMIC COHERENT NULLER

(75) Inventors: Richard L. Kendrick, Foster City, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 299 days.

(21) Appl. No.: 10/349,279

(22) Filed: Jan. 21, 2003

(51) Int. Cl.$^7$ .............................................. G01B 9/02
(52) U.S. Cl. ...................................................... 356/450
(58) Field of Search ........................................ 356/450

(56) References Cited

PUBLICATIONS

Hinz et al., "Imaging circumstellar environments with a nulling interferometer," *Nature*, 395:251–253 (1998).
Serabyn, E., "Nanometer–level path–length cpntrol scheme for nulling interferometry," *Applied Optics*, 38(19):4213–4216 (1999).
Serabyn et al., "Deep nulling of visible light," *Applied Optics*, 38(34):71287132 (1999).

Primary Examiner—Gregory J. Toatley, Jr.
Assistant Examiner—Michael A. Lyons
(74) Attorney, Agent, or Firm—McDermott Will & Emery LLP

(57) ABSTRACT

Embodiments of the present invention are directed to a nuller that is used to significantly reduce or eliminate a monochromatic radiation signal within a polychromatic object field. In one embodiment, a method of nulling a coherent light from a light beam having the coherent light and an incoherent light comprises collimating the light beam having the coherent light and the incoherent light, and destructively interfering the coherent light to null the coherent light with no destructive interference of the incoherent light so as to project the incoherent light without the coherent light.

20 Claims, 3 Drawing Sheets

US 6,882,427 B1

DYNAMIC COHERENT NULLER

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

BACKGROUND OF THE INVENTION

The present invention relates generally to optical apparatus and, more particularly, to a nuller.

Extrasolar planets must be imaged directly if their nature is to be better understood. This will be difficult, however, since the bright light from the parent star (or rather its diffracted halo in the imaging apparatus) can easily overwhelm nearby faint sources. Nulling interferometry has been considered a promising technique for reducing a star's brightness relative to its surroundings, which has the potential to enable the direct detection of extrasolar planets and zodiacal light. The technique is based on the precise cancellation, or nulling, of the starlight received by two separate telescopes, and so the amplitudes, phases, and polarizations of the two on-axis electric fields must all be matched to high accuracy across the wave band of interest. To cancel on-axis starlight to high accuracy, some have sought to combine the electric fields from two telescopes viewing a common star exactly out of phase at all wavelengths across the band of interest. One method for introducing the needed achromatic π-rad phase difference is a geometric flip of the electric-field vector, such as that provided by a rotational shearing interferometer. This requires nanometer-level path-length control which is rather complex to implement.

BRIEF SUMMARY OF THE INVENTION

Stellar interferometers usually operate in a Michelson (pupil plane) configuration which means they have a nearly zero phased field of view. The star image is nulled because the path lengths from the separate apertures have exactly the same path length plus ½ wavelength. The null is not complete as one moves off axis slightly allowing the light from the nearby planet to be observed. Multiple telescope imaging systems are operated in Fizeau (image plane) configuration which gives a large phased field of view. A traditional stellar nulling system would null the entire image.

Embodiments of the present invention are directed to a nuller that employs a relatively simple configuration to null only the radiation from a coherent source allowing all of the image to be viewed. The dynamic coherent nuller is used to significantly reduce or eliminate a monochromatic radiation signal within a polychromatic object field. For example, an astronomical monochromatic laser guide star can be nulled while viewing the polychromatic star field surrounding the coherent source. An interferometry technique is used to produce destructive interference between coherent waves of the coherent light of the monochromatic source without destructive interference of the incoherent light of the polychromatic image. In some embodiments, a simple Mach-Zehnder or Michelson interferometer configuration is used. The technique is applicable to a single aperture telescope as well as a multiple telescope array. The nuller can be used with stellar interferometers to reduce the signal from a star in order to observe nearby planets or exo-zodiacal dust.

An aspect of the present invention is directed to a nuller for nulling a coherent light from a light beam having the coherent light from a monochromatic source and an incoherent light from a polychromatic image. The nuller comprises a collimating lens configured to collimate the light beam having the coherent light and the incoherent light. An interferometer is configured to receive the collimated light beam and to produce destructive interference of the coherent light to null the coherent light with no destructive interference of the incoherent light so as to project the incoherent light of the polychromatic image without the coherent light from the monochromatic source.

In some embodiments, the interferometer is one of a Mach-Zehnder interferometer and a Michelson interferometer. The interferometer comprises a beam splitter configured to split the light beam into two paths which are recombined, the two paths have a path length difference equal to (n+½) times a wavelength of the coherent light, where n is an integer. The interferometer comprises a movable reflective member in one of the two paths, and the movable reflective member is movable to adjust a path length in the path to achieve the path length difference.

Another aspect of the invention is directed to a method of nulling a coherent light from a light beam having the coherent light and an incoherent light. The method comprises collimating the light beam having the coherent light and the incoherent light, and destructively interfering the coherent light to null the coherent light with no destructive interference of the incoherent light so as to project the incoherent light without the coherent light.

In some embodiments, destructively interfering the coherent light comprises splitting the light beam into two split light beams along two paths and recombining the light beams from the two paths. The two paths have a path length difference equal to (n+½) times a wavelength of the coherent light, where n is an integer. One of the two paths may include a movable reflective member which is movable to adjust a path length in the path to achieve the path length difference for nulling the coherent light. Alternatively, one of the two paths may include a pair of movable reflective members which are oriented at an angle relative to one another and which are movable together to adjust a path length in the path to achieve the path length difference for nulling the coherent light. The coherent light has a coherence length which is substantially higher than a coherence length of the incoherent light. For example, the coherent light may have a coherence length of at least about 40 µm and the incoherent light may have a coherence length of less than about 20 µm. In a specific embodiment, the coherent light has a coherence length of about 50 µm and the incoherent light has a coherence length of about 10 µm.

In accordance with another aspect of the present invention, a method of nulling a coherent light from a light beam having the coherent light and an incoherent light comprises collimating the light beam having the coherent light and the incoherent light. The coherent light has a coherence length which is substantially higher than a coherence length of the incoherent light. The method further comprises splitting the light beam into two split light beams along two paths, and recombining the light beams from the two paths. The two paths have a path length difference equal to (n+½) times a wavelength of the coherent light, where n is an integer.

In some embodiments, the coherent light is produced from an astronomical monochromatic laser guide star, and the incoherent light is produced from an image of a polychromatic star field.

DETAILED DESCRIPTION OF THE INVENTION

Figure 1:
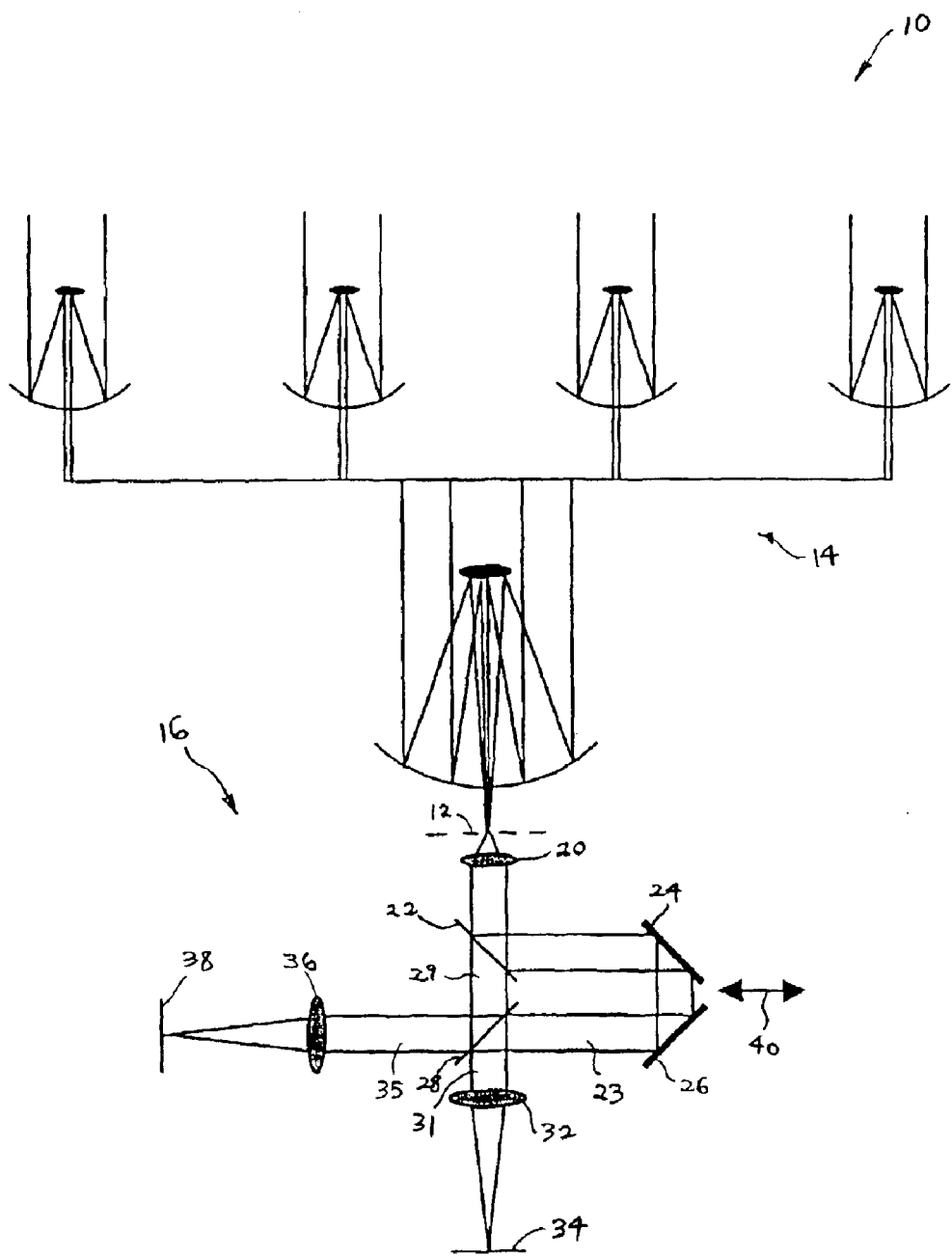
FIG. 1 is a simplified schematic view of a coherent nuller employing a Mach-Zehnder configuration according to an embodiment of the present invention.

FIG. 1 shows a nuller 10 employing a Mach-Zehnder configuration to null a monochromatic light from a coherent point source. An image is projected onto an image plane 12 from a multiple telescope system 14. Also projected on the image plane 12 by the telescope system 14 is a monochromatic light from a coherent point source. The monochromatic light may have been projected from the telescope system 14 into the sky to correct for turbulence of the atmosphere. The image and monochromatic light are directed and processed through a Mach-Zehnder interferometer 16.

As shown in FIG. 1, the beam containing the image and monochromatic light are collimated by a collimating lens 20. A first beam splitter 22 splits the beam along two paths. The first path leads a portion of the beam 23 to a pair of reflective members or mirrors 24, 26 which reflect that portion of the beam to a second beam splitter 28. The second path leads the other portion of the beam 29 from the first beam splitter 22 directly to the second beam splitter 28. The second beam splitter 28 split the two beams 23, 29 along two paths. Along the first path, portions of the beams 23, 29 are combined into a beam 31 directed through an imaging lens 32 which projects the combined beam 31 to a first image plane 34. Along the second path, portions of the beams 23, 29 are combined into a beam 35 directed through an imaging lens 36 which projects the combined beam 35 to a second image plane 38.

The reflective members 24, 26 are movable together in a direction 40. For instance, the reflective members 24, 26 may be attached to a piston which is driven by an actuator or precision stage in the direction 40. The monochromatic light has a wavelength $\lambda$. The position of the reflective members 24, 26 are adjusted in the direction 40 to produce a path delay so that the path length difference is n+½ waves (i.e., $(n+½)\lambda$). The first splitting of the initial beam into beams 23, 29 by the first beam splitter 22 generates a phase shift of the beam 23 by the reflective members 24, 26 with respect to the beam 29 due to the path length difference. When the two beams 23, 29 are combined and redirected by the second beam splitter 28 to the two image planes 34, 38, the beams 23, 29 interfere destructively toward the first image plane 34 for the monochromatic light to null the monochromatic light due to the n+½ wavelength difference, and the beams 23, 29 interfere constructively toward the second image plane 38 to show the monochromatic light because the phase shift is n waves. The broadband incoherent beams of the image do not interfere because the path lengths differ by a distance (e.g., the coherence length is typically higher than about 30 $\mu$m, such as about 50 $\mu$m) that is much greater than the coherence length of the broadband scene (typically less than about 20 $\mu$m, such as about 10 $\mu$m). Thus, the split images add incoherently on the focal planes 34, 38, while the point sources add coherently to null the monochromatic light on the focal plane 34.

Figure 2:
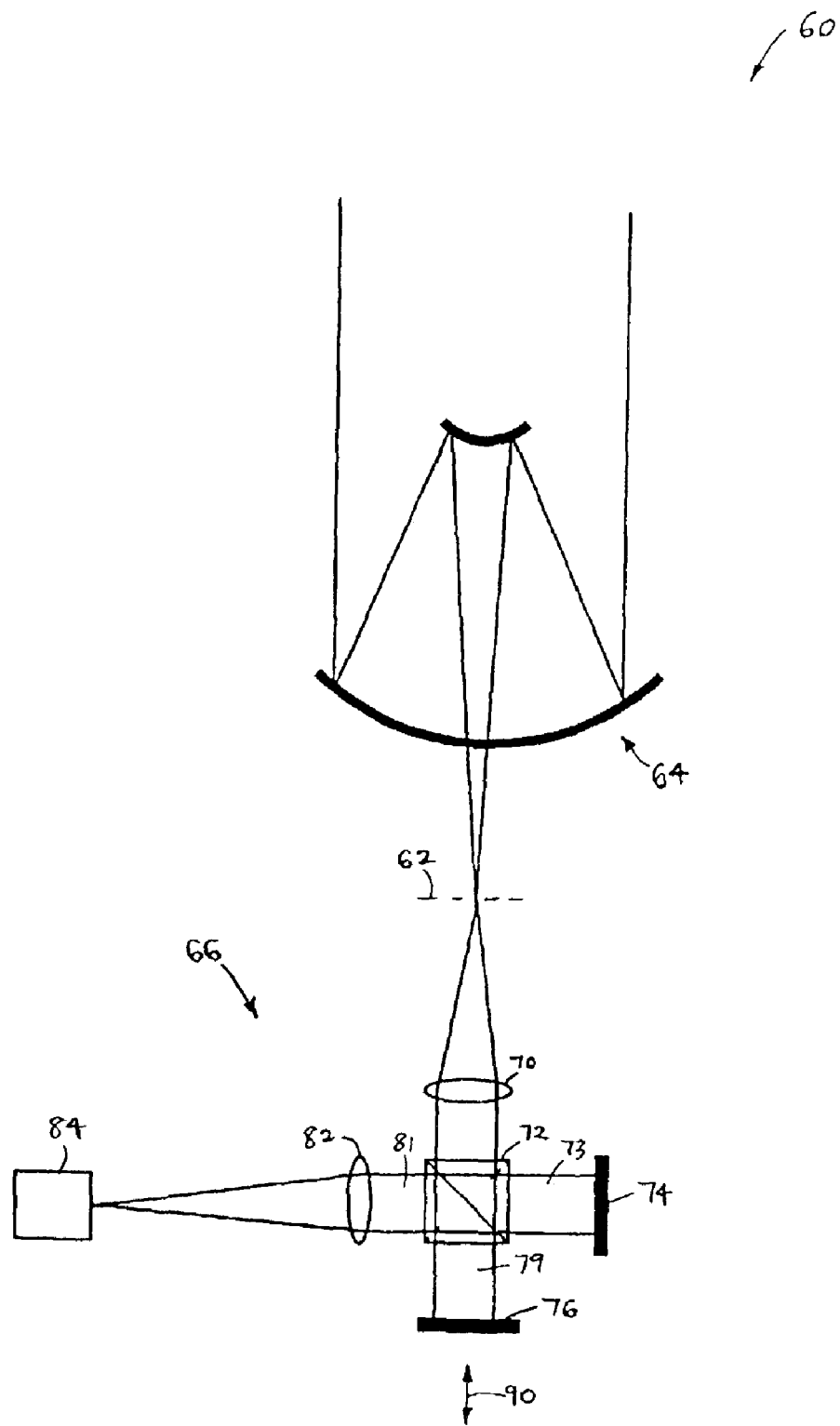
FIG. 2 is a simplified schematic view of a coherent nuller employing a Michelson configuration according to another embodiment of the present invention.

FIG. 2 shows a nuller 60 employing a Michelson configuration to null a monochromatic light from a coherent point source. An image is projected onto an image plane 62 from a telescope system 64. Also projected on the image plane 62 by the telescope system 64 is a monochromatic light from a coherent point source. The monochromatic light may have been projected from the telescope system 64 into the sky to correct for turbulence of the atmosphere. The image and monochromatic light are directed and processed through a Michelson interferometer 66.

As shown in FIG. 2, the beam containing the image and monochromatic light are collimated by a collimating lens 70. A beam splitter 72 splits the beam along two paths. The first path leads a portion of the beam 73 to a first reflective member or mirror 74, which reflects that portion of the beam 73 directly back to the beam splitter 72. The second path leads the other portion of the beam 79 from the beam splitter 72 to a second reflective member or mirror 76, which reflects that portion of the beam 79 directly back to the beam splitter 72. The beam splitter 72 combines the reflected beam portions 73, 79 and directs the resulting beam 81 through an imaging lens 82 which projects the combined beam 81 to a detector such as a CCD 84.

At least one of the reflective members is movable. For example, the reflective member 76 is movable in a direction 90 by a piston or the like which is driven by an actuator or precision stage. The monochromatic light has a wavelength $\lambda$. The position of at least one of the reflective members, in this case the mirror 76, is adjusted in the direction 90 to produce a path delay so that the path length difference between the two beams 73, 79 is n+½ waves (i.e., $(n+½)\lambda$). The splitting of the initial beam into beams 73, 79 by the beam splitter 72 and the reflection of the beams 73, 79 by the reflective members 74, 76, respectively, generate a phase shift between the beams 73, 79 due to the path length difference. When the two beams 73, 79 are combined into the beam 81 and directed by the beam splitter 72 to the detector 84, the beam components 73, 79 interfere destructively toward the detector 84 for the monochromatic light to null the monochromatic light due to the n+½ wavelength difference. The broadband incoherent beams of the image do not interfere because the path lengths differ by a distance (e.g., the coherence length is typically higher than about 30 $\mu$m, such as about 50 $\mu$m) that is much greater than the coherence length of the broadband scene (typically less than about 20 $\mu$m, such as about 10 $\mu$m). Thus, the split images add incoherently on the focal plane at the detector 84, while the point sources add coherently to null the monochromatic light on the focal plane at the detector 84.

Figure 3:
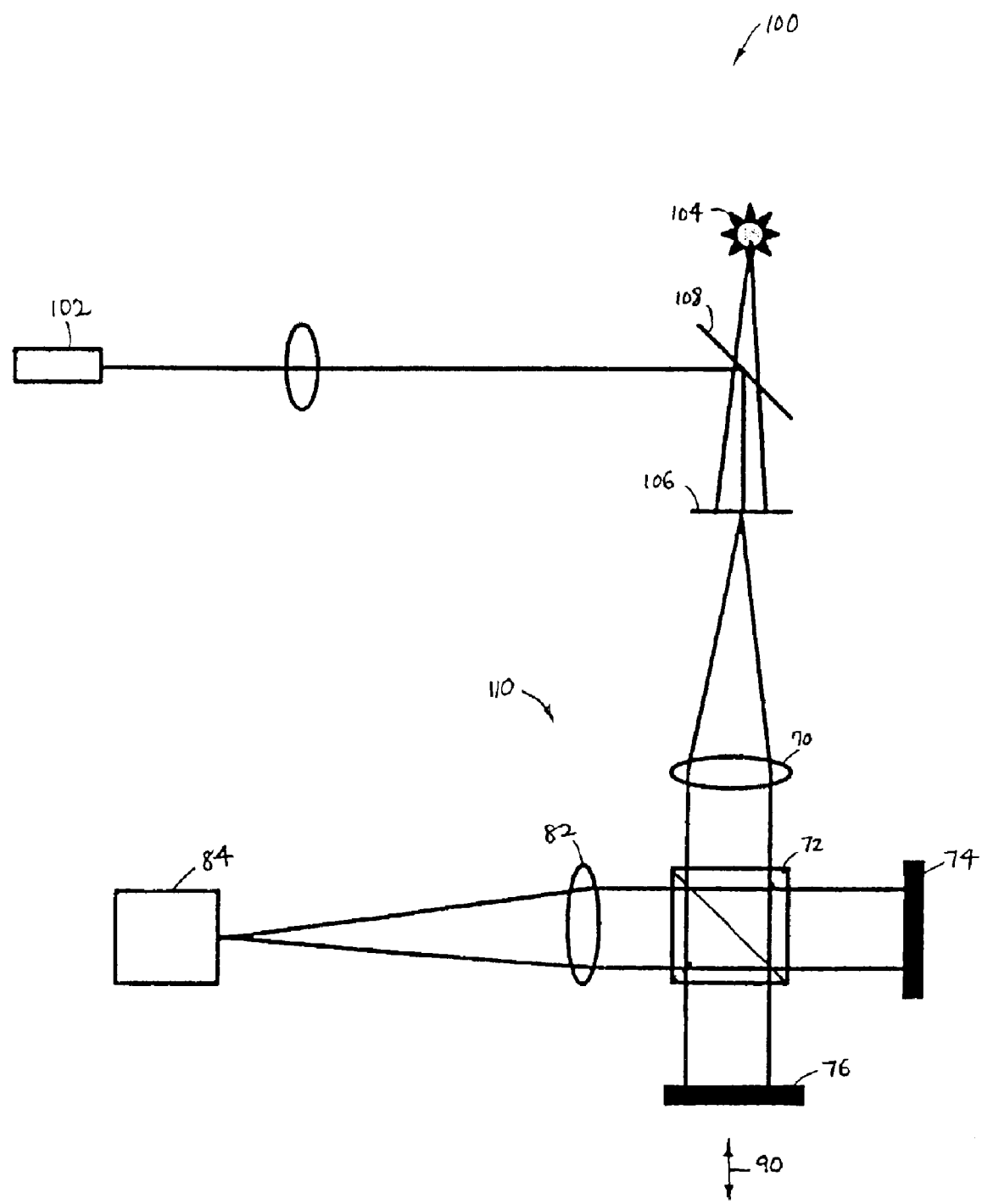
FIG. 3 is a simplified schematic view of a coherent nuller employing a Michelson configuration in a laboratory experimental setup according to another embodiment of the present invention.

Experiments using laboratory setups have been conducted to verify the methodology. FIG. 3 shows an experimental apparatus 100 employing a Michelson configuration to null a monochromatic light from a coherent point source. In this embodiment, the coherent point source is a laser diode 102. An image is projected using a white light 104 onto a transparency 106 which represents an extended scene at an image plane. A beam splitter 108 is used to combine the monochromatic light from the laser diode 102 with the beam from the white light 104 which illuminates the transparency. The image and monochromatic light are collimated and processed through a Michelson interferometer 110, which may be the same as the Michelson interferometer 66 of FIG.

2. For convenience, the same reference characters are used for the collimating lens 70, the beam splitter 72, the first reflective member 74, the second reflective member 76, the imaging lens 82, and the detector 84. Of course, the experimental set in another embodiment may employ a different interferometer, such as the Mach-Zehnder interferometer 16 of FIG. 1. The position of the second reflective member 76 is adjusted to null the monochromatic light from the laser diode 102. A null of 40:1 peak value ratio is demonstrated.

The above-described arrangements of apparatus and methods are merely illustrative of applications of the principles of this invention and many other embodiments and modifications may be made without departing from the spirit and scope of the invention as defined in the claims. For instance, the Mach-Zehnder or Michelson interferometer may be replaced by another interferometry setup. The scope of the invention should, therefore, be determined not with reference to the above description, but instead should be determined with reference to the appended claims along with their full scope of equivalents.

What is claimed is:

1. A nuller for nulling a coherent light from a light beam having the coherent light from a monochromatic source and an incoherent light from a polychromatic image, the nuller comprising:

a collimating lens configured to collimate the light beam having the coherent light and the incoherent light; and an interferometer configured to receive the collimated light beam and to produce destructive interference of the coherent light to null the coherent light with no destructive interference of the incoherent light so as to project the incoherent light of the polychromatic image without the coherent light from the monochromatic source.

2. The apparatus of claim 1 wherein the interferometer is one of a Mach-Zehnder interferometer and a Michelson interferometer.

3. The apparatus of claim 1 wherein the interferometer comprises a beam splitter configured to split the light beam into two paths which are recombined, the two paths have a path length difference equal to (n+½) times a wavelength of the coherent light, where n is an integer.

4. The apparatus of claim 3 wherein the interferometer comprises a movable reflective member in one of the two paths, the movable reflective member being movable to adjust a path length in the path to achieve the path length difference.

5. The apparatus of claim 1 wherein the coherent light has a coherence length which is substantially higher than a coherence length of the incoherent light.

6. The apparatus of claim 1 wherein the coherent light has a coherence length of at least about 40 $\mu$m and the incoherent light has a coherence length of less than about 20 m.

7. The apparatus of claim 6 wherein the coherent light has a coherence length of about 50 $\mu$m and the incoherent light has a coherence length of about 10 $\mu$m.

8. A method of nulling a coherent light from a light beam having the coherent light and an incoherent light, the method comprising:

collimating the light beam having the coherent light and the incoherent light; and destructively interfering the coherent light to null the coherent light with no destructive interference of the incoherent light so as to project the incoherent light without the coherent light.

9. The method of claim 8 wherein destructively interfering the coherent light comprises splitting the light beam into two split light beams along two paths and recombining the light beams from the two paths, the two paths having a path length difference equal to (n+½) times a wavelength of the coherent light, where n is an integer.

10. The method of claim 9 wherein one of the two paths includes a movable reflective member which is movable to adjust a path length in the path to achieve the path length difference for nulling the coherent light.

11. The method of claim 9 wherein one of the two paths includes a pair of movable reflective members which are oriented at an angle relative to one another and which are movable together to adjust a path length in the path to achieve the path length difference for nulling the coherent light.

12. The method of claim 8 wherein the coherent light has a coherence length which is substantially higher than a coherence length of the incoherent light.

13. The method of claim 8 wherein the coherent light has a coherence length of at least about 40 $\mu$m and the incoherent light has a coherence length of less than about 20 $\mu$m.

14. The method of claim 13 wherein the coherent light has a coherence length of about 50 $\mu$m and the incoherent light has a coherence length of about 10 $\mu$m.

15. A method of nulling a coherent light from a light beam having the coherent light and an incoherent light, the method comprising:

collimating the light beam having the coherent light and the incoherent light, the coherent light having a coherence length which is substantially higher than a coherence length of the incoherent light;

splitting the light beam into two split light beams along two paths; and recombining the light beams from the two paths, the two paths having a path length difference equal to (n+½) times a wavelength of the coherent light, where n is an integer.

16. The method of claim 15 wherein one of the two paths includes a movable reflective member which is movable to adjust a path length in the path to achieve the path length difference.

17. The method of claim 15 wherein one of the two paths includes a pair of movable reflective members which are oriented at an angle relative to one another and which are movable together to adjust a path length in the path to achieve the path length difference.

18. The method of claim 15 wherein the coherent light has a coherence length of at least about 40 $\mu$m and the incoherent light has a coherence length of less than about 20 $\mu$m.

19. The method of claim 18 wherein the coherent light has a coherence length of about 50 $\mu$m and the incoherent light has a coherence length of about 10 $\mu$m.

20. The method of claim 15 wherein the coherent light is produced from an astronomical monochromatic laser guide star, and wherein the incoherent light is produced from an image of a polychromatic star field.

* * * * *

UNITED STATES PATENT AND TRADEMARK OFFICE
CERTIFICATE OF CORRECTION

PATENT NO. : 6,882,427 B1
DATED : April 19, 2005
INVENTOR(S) : Richard L. Kendrick et al.

It is certified that error appears in the above-identified patent and that said Letters Patent is hereby corrected as shown below:

Column 5,
Line 54, "20 m." should read -- 20µm. --.

Signed and Sealed this

Twelfth Day of July, 2005

JON W. DUDAS
*Director of the United States Patent and Trademark Office*